United States Patent [19]
Ocko

[11] 4,439,949
[45] Apr. 3, 1984

[54] BEAN SPROUTER
[75] Inventor: Stephen Ocko, Brookline, Mass.
[73] Assignee: Data Packaging Corporation, Cambridge, Mass.
[21] Appl. No.: 395,801
[22] Filed: Jul. 6, 1982
[51] Int. Cl.³ .................................... A01G 31/00
[52] U.S. Cl. ............................... 47/61; 47/59
[58] Field of Search ............ 47/60, 61, 62, 63, 14, 47/15, 16, 59, 64, 65

[56] References Cited
U.S. PATENT DOCUMENTS

| | | | |
|---|---|---|---|
| 1,396,235 | 11/1921 | Renstrom | 47/16 |
| 1,643,536 | 9/1927 | Baskerville | 47/16 |
| 2,026,322 | 12/1935 | Raines | 47/61 |
| 4,006,559 | 2/1977 | Carlyon, Jr. | 47/16 |

*Primary Examiner*—Robert A. Hafer
*Assistant Examiner*—Bradley M. Lewis
*Attorney, Agent, or Firm*—Wolf, Greenfield & Sacks

[57] ABSTRACT

A bean sprouter having a base with a fresh water reservoir and a collection chamber for waste water used to wash the sprouts. The sprouts are grown in a container that sits on the base. A timer-motor drives a pump which draws water from the reservoir into the growing container so as to maintain a moist atmosphere for growing and provide moisture for washing the sprouts. The timer is set to run the motor for brief periods at selected intervals.

12 Claims, 3 Drawing Figures

BEAN SPROUTER

INTRODUCTION

This invention relates to seed germinators and more particularly comprises a small, automated seed sprouter designed for home use and suitable for sprouting such things as alfalfa, mung beans, lentils, chick-peas, watercress, sunflower, wheat and flax. Hereafter the word seed is used generically to include beans, grains and other types of ovules from which plants are grown.

Recently many people have begun growing their own sprouts from a wide variety of beans and grains rather than purchasing sprouts from the supermarket. This ensures that the sprouts are fresh and free of harmful chemicals.

Researchers have demonstrated that the nutritional value of seeds increases dramatically during the first two or three days of sprouting. Many people have discovered that sprouts can be very palatable snacks and can be added to soups, salads, vegetable dishes, sandwich fillings, omelets, breads and beverages and can also be used as garnishes. The sprouts are very inexpensive; one half cup of seeds swells to one and one half cups after soaking and explodes into a quart of edible sprouts when fully grown. The cost is about one cent a serving.

The principal object of the present invention is to provide a relatively simple apparatus for use in the home which will automatically cause the seeds to germinate.

A more specific object of the present invention is to provide a domestic bean sprouter which automatically maintains a moist atmosphere for the growing of sprouts and which intermittently washes the beans so as to provide sprouts that are free of any acidy taste.

Another important object of this invention is to provide a sprouter which is relatively inexpensive to manufacture and which requires minimum attention on the part of the user.

SUMMARY OF THE INVENTION

The bean sprouter of this invention includes a base having a reservoir for fresh water and a separate chamber for receiving waste water which has been used to wash the sprouts. A growing container rests upon the base and includes a platform on which the beans are scattered. The platform is tiered so as to cause the water which washes the sprouts to flow to drainage outlets at spaced points which communicate with the waste water chamber. An inexpensive timer-motor operates a centrifugal pump which lifts water periodically from the reservoir to the growing chamber so as to create a moist growing atmosphere for the sprouts and to wash the sprouts regularly so as to ensure that they have a sweet taste.

These and other objects and features of this invention will be better understood and appreciate from the following detailed description of one embodiment thereof, selected for purposes of illustration and shown in the accompanying drawing.

BRIEF FIGURE DESCRIPTION

DETAILED DESCRIPTION

Figure 1:
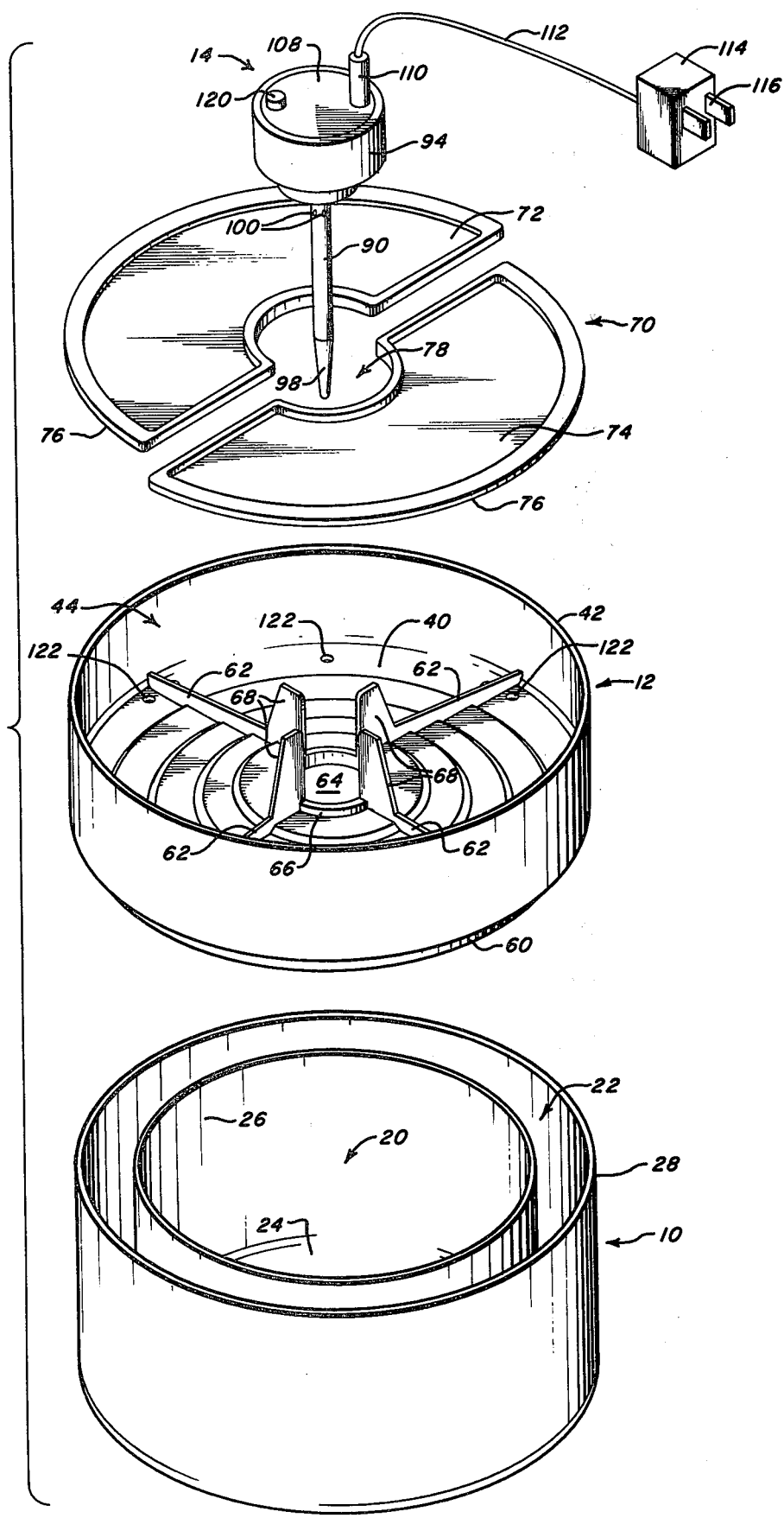
FIG. 1 is an isometric exploded view of the bean sprouter of this invention.

The bean sprouter of this invention is composed of three basic parts, namely, a base 10, growing container 12 and motor-pump assembly 14. These parts are described in detail below.

The base 10 in the illustrated embodiment is generally cylindrical in shape and includes a fresh water reservoir 20 and a surrounding waste water chamber 22. The reservoir 20 and chamber 22 are defined by bottom wall 24, inner cylindrical wall 26 and surrounding cylindrical wall 28. The peripheral portion of the bottom wall 24 is inclined upwardly and outwardly at the waste water chamber 22 as shown at 30 to allow the hands to be slipped under the base for carrying it. A bead 32 essentially aligned with the inner cylindrical wall 26 defines a foot or platform for the base when placed upon a table or other horizontal supporting surface. The outer cylindrical wall 28 is slightly taller than the inner cylindrical wall 26 so as to provide a slight clearance between the top of wall 26 and the bottom of the growing container 12 to allow air to flow between the reservoir 20 and chamber 22. The fresh water reservoir 20 is intended to be filled manually and preferably is large enough to contain enough water to moisturize the interior of the growing container 12 and wash the sprouts grown in it. The shape and function of the base conveniently lends itself to being injection molded of inexpensive plastic material such as high impact styrene.

Figure 3:
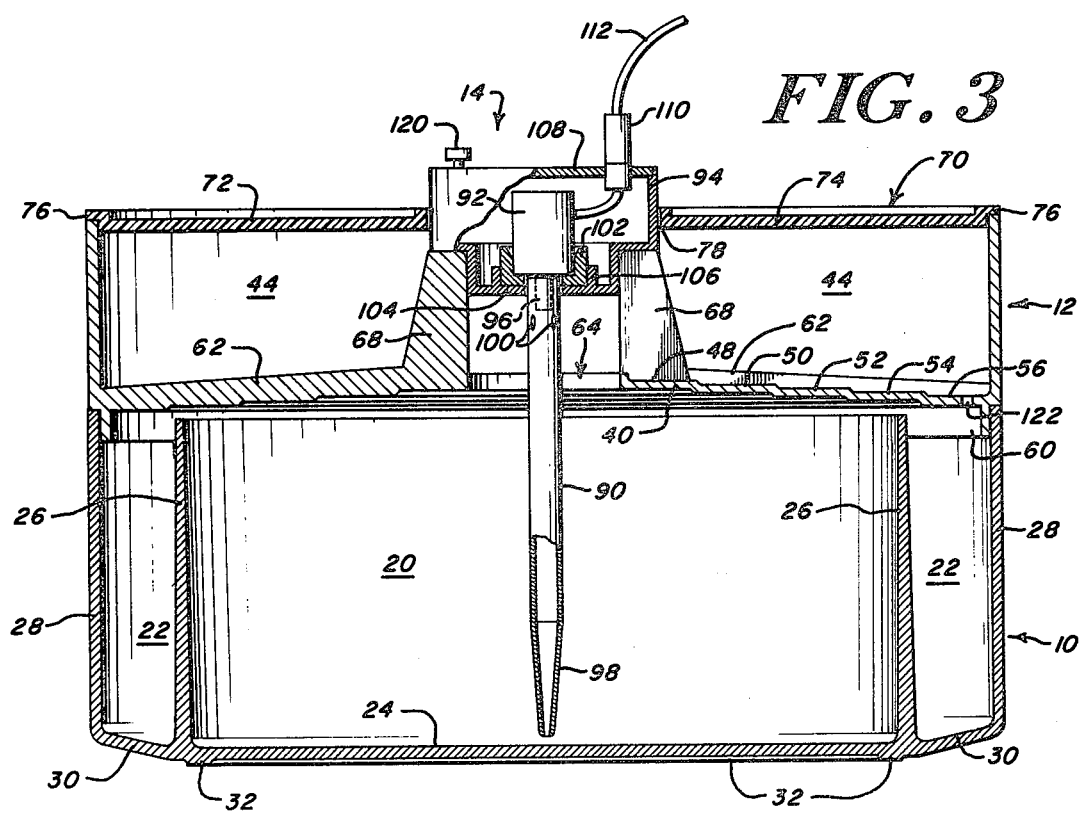
FIG. 3 is a vertical cross-sectional view of the bean sprouter taken along the section line 3—3 in FIG. 2.
Figure 4:
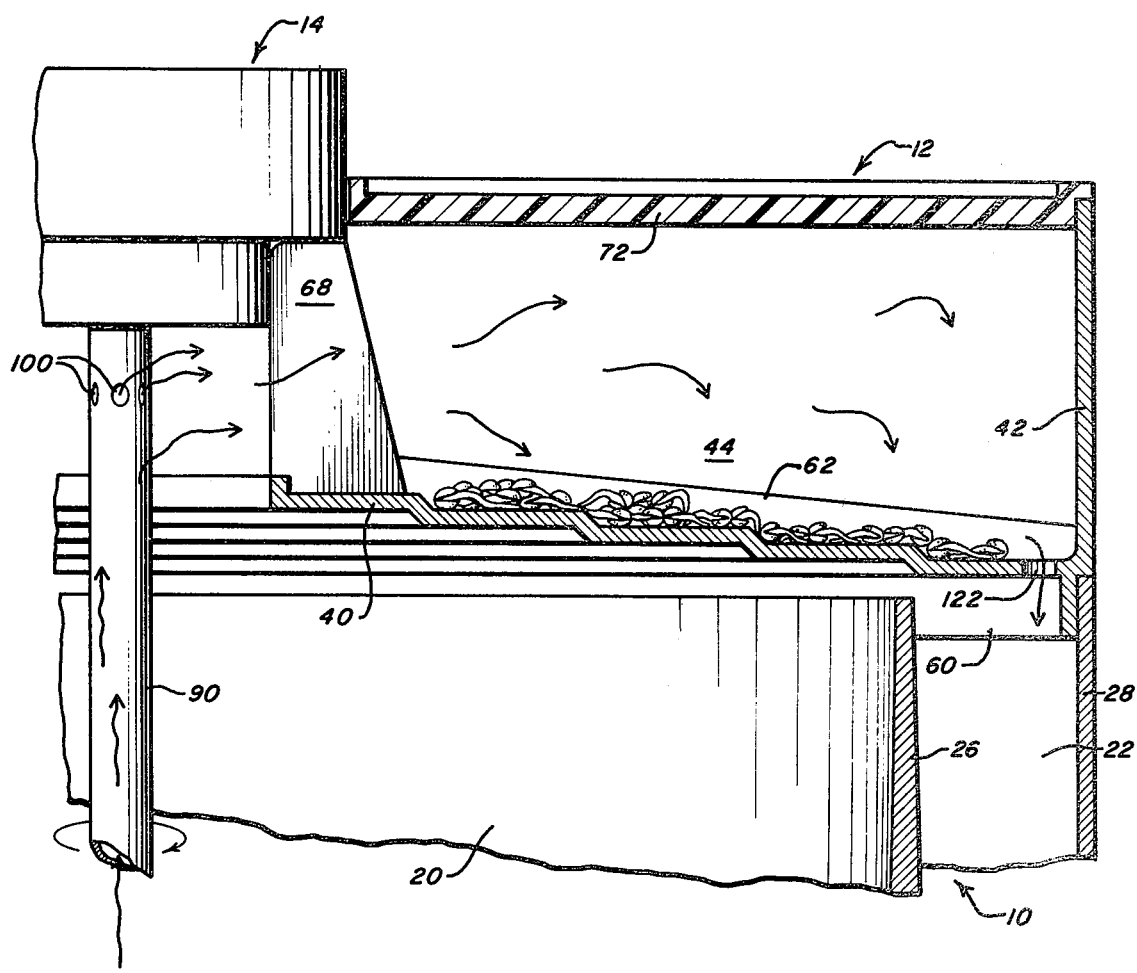
FIG. 4 is a fragmentary cross-sectional view of the bean sprouter and suggests the manner in which the sprouts grow in the device.

The growing container 12 is composed of a tray 40 and an integral, surrounding, generally cylindrical wall 42. The tray and wall together define an open topped chamber 44 within which the sprouts are grown. The tray 40 as shown in FIG. 3 is tiered to provide a series of concentric platforms, with each surrounding platform being at a lower level than its next inner platform. The individual platforms 48, 50, 52, 54 and 56 are inclined very slightly in an outward and downward direction so that any water deposited on the tray 40 will gradually run from the center to the periphery.

A circular flange 60 is formed on the lower surface of the tray 40 and extends downwardly from it so as to nest within the outer cylindrical wall 28 of the base when the growing container 12 is placed on the base. The flange 60 obviously prevents the container 12 from moving laterally off the base or being accidentally jarred from it.

In FIG. 1 the upper surface of the tray 40 is shown divided into quadrants by four radial ribs 62 that extend from adjacent the center of the container 12 to the surrounding cylindrical wall 42. The ribs 62 serve to stiffen the container 12 and provide convenient dividers for the tray so as to define separate and distinct areas, each of which may be used for different seeds or for seeds in different cycles as will be explained more fully below.

The tray 40 is provided with a central opening 64, and an inner low cylindrical wall 66 defines a barrier about the opening 64 so as to prevent seeds deposited on the tray from falling through the opening and into the reservoir 20 in the base. The ribs 62 at their inner ends terminate in upstanding webs 68 that together define a platform for the housing of the motor-pump assembly 14.

Container 12 is provided with a separate cover 70 composed of two identical semicircular sections 72 and 74. Each section 72 and 74 of the cover is provided at its curved edge with a lip 76 which rests upon the upper edge of the cylindrical wall 42 so as to support the cover sections in place. The two sections together describe a central circular opening 78 through which the housing 94 of the motor-pump assembly extends. The segmented cover allows the user to open half or all of the container 12 as desired.

The motor-pump assembly includes a lift tube 90, timer-motor 92 and the housing 94. The motor 92 typically mey be a 3 volt, 150 milliamper motor with a built in timer that cause the motor to rotate at preset intervals for a preset duration. The motor shaft 96 engages the top of the lift tube 90 so as to cause the lift tube to rotate rapidly when the motor is turned on. Typically the lift tube 90 may rotate at 500-1000 rpm.

Figure 2:
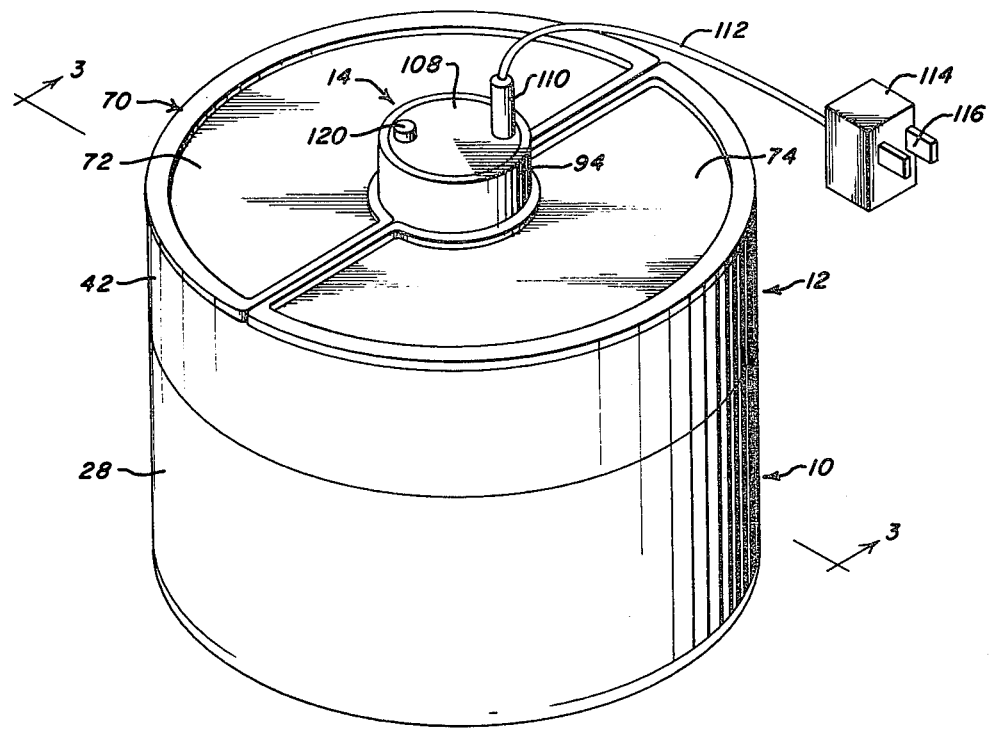
FIG. 2 is a perspective view of the assembled bean sprouter shown in FIG. 1.

Lift tube 90 is upwardly and outwardly flaired at its lower end 98, and the lift tube is designed to extend downwardly to a point immediately adjacent the bottom wall 24 of reservoir 20. The flair of the lower end 98 of the lift tube causes water to climb up the tube under the influence of centrifugal force when the tube is rotated, and the water which climbs in the tube is sprayed out the openings 100 adjacent the top of the tube. The top of the tube as is evident in FIG. 2 is located intermediate the top and bottom of the container 12, and when the cover 70 is in place on the container, water droplets are discharged through the openings 100 and create a moist atmosphere in the chamber 44 of the container.

The timer-motor 92 is shown in FIG. 3 to be supported at its bottom by collar 102 which is retained on the bottom wall 104 of housing 94 by flange 106. The housing also includes a removable cover 108, which in turn carries terminals 110 that join the leads of the timer-motor 92 to the power cord 112. The power cord 112 carries a step down transformer 114 at its plug 116 adapted to be connected to a standard convenient electrical outlet.

The sprouter functions as follows: The reservoir 20 of the base is filled with water, the container 12 is mounted on the upper edge of cylindrical wall 28, and the motor-pump assembly 14 is placed on the webs 68. Previously the timer-motor 92 would have been placed in housing 94, and the height of the motor may be adjusted on the collar 102. The plug 116 is then connected to a convenience outlet. Next, the tray 62 may be lightly sprinkled with water to cause the seeds to adhere to the tiered inclined platforms of the tray and not roll to the tray periphery. To wet the tray, the starter 120 is depressed, which momentarily energizes the motor and causes the pump to lightly sprinkle the interior of the chamber 44. The user then spreads the selected seeds onto the four sections of the tray, and the cover sections 72 and 74 are placed over the chamber to close it. Thereafter, the motor automatically will periodically drive the pump (rotate the lift tube) to moisturize the atmosphere within chamber 44 and wash the sprouts. The water will drip down the platforms to the tray periphery and flow through the passages 122 into waste water chamber 22 so as to remove the acidy water from the growing chamber. Typically, the motor may run for 10-15 seconds every 15 minutes to maintain the desired moisture level in growing chamber 44. The size and shape of the lift tube 90 and ports 100 and the speed of rotation of the lift tube will determine how frequently and for what duration the motor should run. This operation will be continued around the clock until the sprouts are fully grown. Normally four days is required for the sprouts to reach maturity, and during the fourth day, the cover 70 may be removed so as to allow the sprouts to turn green.

As indicated, the intermittent sprinking of the container 44 to provide the moist atmosphere for growth also provides sufficient moisture to wash the sprouts growing in the chamber. The acidy water which has washed the sprouts runs through the ports 122 about the plate periphery. That water is discharged as waste water into the collection chamber 22.

The four quadrants of the tray in the preferred embodiment may each be filled with a variety of seeds. In addition, the seeds in the several quadrants may be started on successive days. Under the latter situation, the four quadrants would produce a fresh harvest each day, as the sprouts normally take four days to mature.

The embodiment shown has many advantages. For example, the drainage provided in the container 44 allows the system to expel the acidy water into the container 22 so as to prmote the sweet taste and crispiness of the sprouts. The cover 70 which preferably is opaque to promote the growth of the sprouts may readily be removed to allow light in during the last or fourth growing day so that the sprouts may manufacture the desired chlorophyll. While in the embodiment illustrated the cover is made of two sections to permit the cover to be conveniently removed (or partially removed), it will be appreciated that the cover could have a shutter-like arrangement which would allow the cover to be opened without actually removing it from the growing container 12. The reservoir 20 is large enough to provide sufficient water to maintain the moist atmosphere in the chamber 44 and wash the sprouts during the full four day growing period without requiring a refill. Thus, the sprouts need not be disturbed throughout the complete cycle. The very simple pump arrangement utilized promotes the low cost of the item. The timer-motor may or may not be adjustable to enable the user to vary the preset periods for sprinkling and to alter the frequency of the spraying periods. The step down transformer 114 provides very low voltage for the motor so that there is no danger of electric shock even though the motor is used in a damp atmosphere. Alternatively, the motor may be battery operated. The housing for the timer-motor, of course, further protects the electrical elements.

In the preferred embodiment, the base 10 and growing container 12 as well as the timer-motor container 94 are all made of plastic material and may for convenience and minimum expense be injection molded. It will be appreciated that the device is suitable for use with a wide variety of seeds to grow such things as alfalfa, mung beans, lentils, chick-peas, watercress, sunflower, wheat and flax. In a device which is only approximately 12 inches in diameter, the sprouter is capable of producing fresh sprouts each day in sufficient quantity for a family of four at an exceedingly low cost.

Having described this invention in detail, those skilled in the art will appreciate that numerous modifications may be made thereof without departing from its spirit. Therefore, it is not intended to limit the breadth of this invention to the single embodiment illustrated and described. Rather, it is intended that the scope of the invention be determined by the appended claims and their equivalents.

What is claimed is:

1. A seed sprout grower comprising:
    a base having a reservoir storing water for feeding and washing the sprouts and a waste water chamber for receiving used water after it has been supplied to the sprouts,
    a container supported by the base above the reservoir and waste water chamber in which the seeds are deposited and the sprouts are grown,
    a number of passages through the container communicating with the waste water chamber for allowing water in the container to drain into said chamber,
    a pump including an inlet communicating with the water in the reservoir and having an outlet extending to the container, said outlet enabling the pump to spray water about the seeds, a portion of said water washing the seeds and flowing through the passages to the waste water chamber,
    a timer-motor connected to the pump causing water to flow from the reservoir to the container for selected periods at selected intervals,
    and a cover enclosing the container.

2. A seed sprout grower as defined in claim 1 further characterized by said pump being a centrifugal pump including a lift tube adapted to have its lower end immersed in the water in the reservoir and having its upper end extending into the container, said tube having openings in the container enabling the tube to expell a mist of water into said container.

3. A seed sprout grower as defined in claim 1 further characterized by said cover being opaque for preventing light from reaching the sprouting seeds when the cover closes the container,
    and means for altering the cover to allow all or only part of the contents of the container to be exposed to light.

4. An apparatus as defined in claim 2 further characterized by
    said reservoir being capable of storing sufficient water to fully sprout the seeds.

5. A seed sprout grower as defined in claim 1 further characterized by
    the tray being higher in the center than at the periphery,
    and said lift tube entering the container from the base at the center of the tray.

6. A seed sprout grower as defined in claim 5, further characterized by
    said reservoir being at the center of the base and said waste water chamber surrounding said reservoir.

7. A seed sprout grower as defined in claim 6 further characterized by
    said base and container being generally cylindrical and with the container being removable from the base.

8. A seed sprout grower as defined in claim 1 further characterized by
    said timer-motor being removably supported on the container,
    and said tube extending downwardly from the timer-motor through the tray into the reservoir.

9. A seed sprout grower as defined in claim 8 further characterized by
    said reservoir being capable of storing sufficient water to fully sprout the seeds.

10. A seed sprout grower as defined in claim 8 further characterized by
    said cover being opaque for preventing light from reaching the sprouting seeds when the cover closes the container,
    a means for altering the cover to allow all or only part of the contents of the container to be exposed to light 11. A seed sprout grower as defined in claim 7 further characterized by
    said timer-motor being removably supported on the container,
    and said tube extending downwardly from the timer-motor through the tray into the reservoir.

12. A seed sprout grower as defined in claim 1 further characterized by
    said tray being tiered,
    and said passages connecting the lowest tiers of the tray to the waste water chamber.

* * * * *